US009243605B2

(12) United States Patent
Figueroa Nuñez

(10) Patent No.: US 9,243,605 B2
(45) Date of Patent: Jan. 26, 2016

(54) POWER GENERATING PLANT AND FLOATING PLANT FOR RIVERS AND CANALS

(75) Inventor: Fernando Figueroa Nuñez, Santiago (CL)

(73) Assignee: Asociacion de Canalistas Sociedad del Canal del Maipo, Santiago (CL)

( * ) Notice: Subject to any disclaimer, the term of this patent is extended or adjusted under 35 U.S.C. 154(b) by 0 days.

(21) Appl. No.: 14/234,085

(22) PCT Filed: Jul. 21, 2011

(86) PCT No.: PCT/IB2011/053243
§ 371 (c)(1),
(2), (4) Date: Jan. 21, 2014

(87) PCT Pub. No.: WO2013/011357
PCT Pub. Date: Jan. 24, 2013

(65) Prior Publication Data
US 2014/0159366 A1 Jun. 12, 2014

(51) Int. Cl.
F03B 7/00 (2006.01)
F03B 13/10 (2006.01)
F03B 17/06 (2006.01)
F03B 15/00 (2006.01)
F03B 15/14 (2006.01)

(52) U.S. Cl.
CPC ............... *F03B 13/10* (2013.01); *F03B 15/00* (2013.01); *F03B 15/14* (2013.01); *F03B 17/063* (2013.01); *F05B 2240/121* (2013.01); *F05B 2240/242* (2013.01); *F05B 2240/932* (2013.01); *F05B 2260/406* (2013.01); *Y02E 10/226* (2013.01); *Y02E 10/28* (2013.01)

(58) Field of Classification Search
USPC ................................................ 416/86; 290/54
See application file for complete search history.

(56) References Cited

U.S. PATENT DOCUMENTS

| 482,034 A | * | 9/1892 | Beery | 416/86 |
| 757,909 A | * | 4/1904 | Gilliland | 405/75 |
| 1,757,885 A | * | 5/1930 | Weaver | 92/138 |

(Continued)

FOREIGN PATENT DOCUMENTS

| CN | 2869360 Y | * | 2/2007 |
| CN | 101109355 A | * | 1/2008 |
| DE | 2730735 A | * | 1/1979 |

(Continued)

OTHER PUBLICATIONS

International Search Report and Written Opinion of the International Searching Authority for PCT/IB2011/053243 (in English and Spanish), mailed Apr. 16, 2012; ISA/ES.

*Primary Examiner* — Joseph Waks
(74) *Attorney, Agent, or Firm* — Harness, Dickey & Pierce, P.L.C.

(57) ABSTRACT

A power generating and floating plant (100) over a natural river, a man-made canal or similar for the generation of electricity that comprises: a floating platform (102) of the Catamaran type with pontoons (112) that speed up the flow rate (300) entering into a turbine; a metal grill (113) between said pontoons (112) before the turbine; at least one turbine with a central shaft (103), wherein said turbine comprises a water wheel (101) with curved vanes (410) and at least two supporting disks (400), where said curved vanes (410) rest, and where said supporting disks (400) comprise a plurality of radial and concentric holes (402); and a low-engine speed, permanent magnet generator (105).

17 Claims, 4 Drawing Sheets

(56) References Cited

U.S. PATENT DOCUMENTS

| | | | | |
|---|---|---|---|---|
| 2,764,871 | A | * | 10/1956 | Dowling .................... 405/75 |
| 3,234,445 | A | * | 2/1966 | Calvert ..................... 318/703 |
| 3,993,913 | A | * | 11/1976 | Dickman .................... 290/53 |
| 4,241,283 | A | * | 12/1980 | Storer, Sr. .................. 290/54 |
| 4,317,330 | A | * | 3/1982 | Brankovics .................. 60/398 |
| 4,372,731 | A | | 2/1983 | Fonda-Bonardi |
| 4,436,480 | A | | 3/1984 | Vary |
| 4,737,070 | A | * | 4/1988 | Horiuchi et al. ............... 415/7 |
| 4,804,855 | A | * | 2/1989 | Obermeyer ................... 290/54 |
| 7,602,076 | B1 | | 10/2009 | Sipp |

FOREIGN PATENT DOCUMENTS

| | | |
|---|---|---|
| FR | 2914028 A1 | 9/2008 |
| GB | 130824 A | 8/1919 |
| GB | 154832 A | 12/1920 |
| GB | 188747 A | 11/1922 |
| JP | S5810167 A | 1/1983 |
| JP | S59126080 A | 7/1984 |
| WO | 2004/020822 A1 | 3/2004 |

* cited by examiner

POWER GENERATING PLANT AND FLOATING PLANT FOR RIVERS AND CANALS

CROSS-REFERENCE TO RELATED APPLICATIONS

This application is a U.S. National Stage of International Application No. PCT/IB2011/053243, filed on Jul. 21, 2011 published in Spanish as WO/2013/011357 on Jan. 24, 2013. The disclosure of the above application is incorporated herein by reference.

FIELD OF APPLICATION

This invention related to the power generating industry, in particular to a power generating and floating plant over a natural river, a man-made canal or similar for electric generation.

BACKGROUND

The use of potential or kinetic power from water in order to provide driving force and more specifically electric energy is widely known.

There is a number of water resources, such as irrigation canals, feeding or discharge canals to and from industrial rotary machines or hydraulic power plants, brooks, rivers, lakes or estuaries with sufficient flow rate to produce electric power.

For many years, treadmills or waterwheels have been widely used to obtain energy from the moving water and to turn stone wheels or industrial machinery and some small electric generators in a relatively simple, low-cost way.

In the previous art, different patent applications have been found that describe turbines to use the flow rate of rivers or canals, such as the publication of the international patent application N° WO 2004/020822. This document describes a hydroelectric power plant installed in the central part of a river, so that to use the higher speed and power of the rivers, as well as its depth. The flow rate is increased by flow controllers or guides, where a turbine with blades is installed in the lower end. Upstream the turbine, a three-part dam is installed, wherein especially the first part of the dam is installed in the lower part of the flow controllers, and the second and third parts of the dam are installed over the supporting bracket of the dam with the float. As long the level of water increases or decreases, the float rises or lowers down the second and third parts of the dam providing water to the blade turbine. The blade turbines, as well as dams, can be installed at the outlet of the flow controller, so that to increase the capacity of the hydroelectric power plant. The solution described in this document is oriented to solve the technical issue of loss of efficiency of a turbine when it is too deeply immersed in the river flow and undesired materials dragged into the turbine by said river flow, so that a floating, adjustable dam can be installed according to the level of the river flow.

Also the U.S. Pat. No. 7,602,076 is known that describes a hydroelectric generation system comprising an anchor adjacent to a river, a floating platform on the river and an arm assembly connecting the anchor to the platform, wherein the arm includes a plurality of arms connected together, so that the level of the platform can vary with the level of the river directly. This solution is oriented to solve the technical issue of loss of efficiency of a turbine when it is too deeply immersed in the river flow by adjusting the height of the turbine according to the river flow, so that it also deals with the issue of preventing undesired material to enter the turbine.

Technical Issue

As noted in the previous art, turbines installed in a river or canals can have height-adjusting means to avoid losses of efficiency when being too deeply immersed in the river flows or canals. Also, means are known to speed up the river flow entering the turbine to increase the power generated and means to prevent undesirable elements from entering the turbine, such as branches, leaves or other elements that can be harmful to the turbine. Notwithstanding, no other solution is seen that deals with the hydrodynamic issues related to the speeding up of the flow entering the turbine, which on the one hand can generate cavitation in the turbine, thus fast impairment being caused and, on the other hand, can result in losing efficiency and effective power and in excessive vibrations in the turbine shafts, thus accelerating the wear due to materials fatigue.

Technical Solution

For the issue of cavitation and undesirable turbulence being solved, a floating power plant for electric generation in a natural river, a man-made canal or similar is provided, comprising, among others, a turbine with a rotor of curved vanes and at least two supporting disks, where said vanes rest; wherein said supporting disks comprise a plurality of radial and concentric holes to allow the water circulation, which allows reducing the dragging of water, turbulence and cavitation, increasing the turbine durability and the general efficiency of the turbogenerator.

Technical Advantages

This invention provides important technical advantages by modifying the turbine along with the remaining elements of the power plant, such as a floating platform of the Catamaran type with pontoons that speed up the flow entering the turbine and the stabilizing bar fixed to regulating cylinders.

The technical advantages are increased efficiency, because it locates the turbine at the optimal immersed depth to receive the flow along with the increase of flow due to the acceleration generated by the pontoons of the floating platform. Thanks to the turbine's modified rotor, turbulences and drags reduce and the cavitation in the turbine is prevented, allowing safe speeding up by the pontoons of the floating platform.

DETAILED DESCRIPTION OF THE INVENTION

Figure 1:
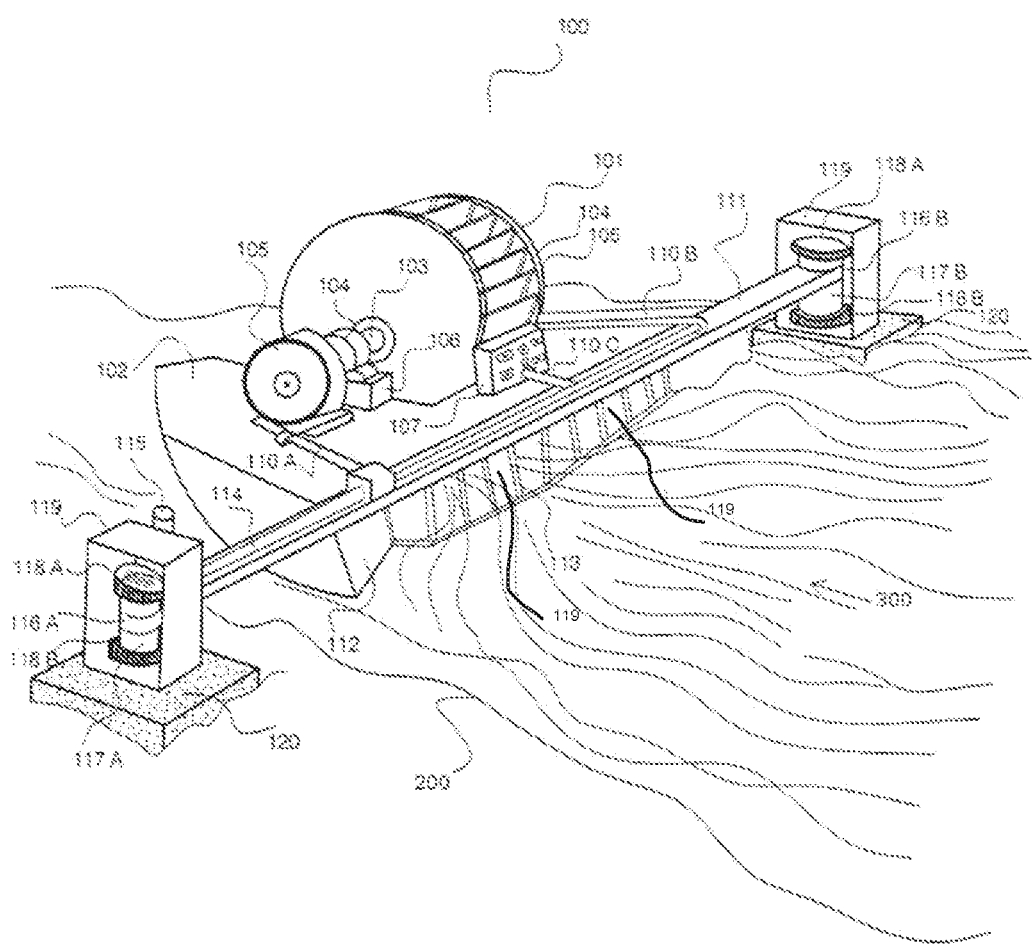
FIG. 1 schematically illustrates a power generating and floating plant according to this invention.
Figure 2:
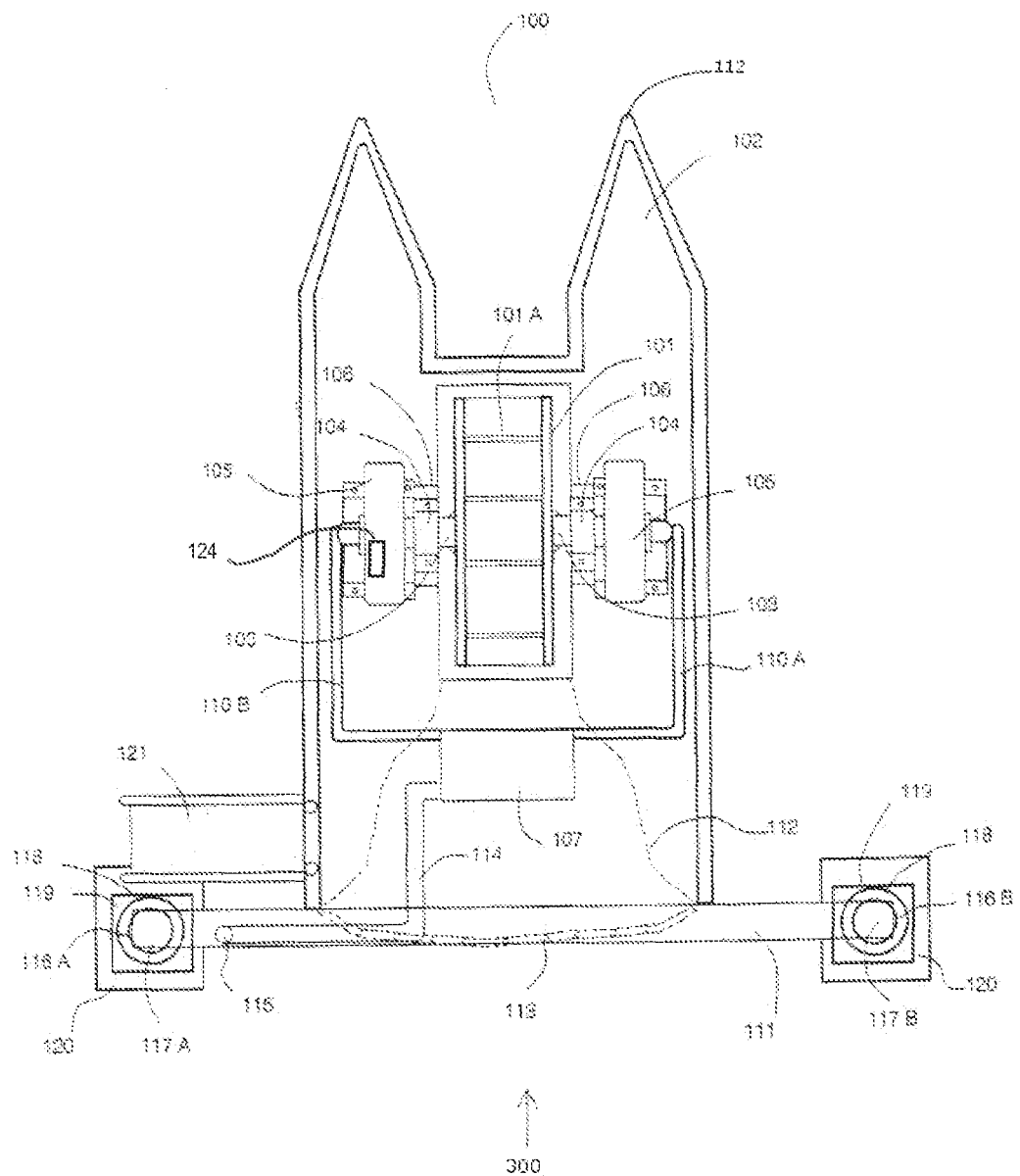
FIG. 2 is a schematic upper view of the power generating and floating plant according to this invention.
Figure 3:
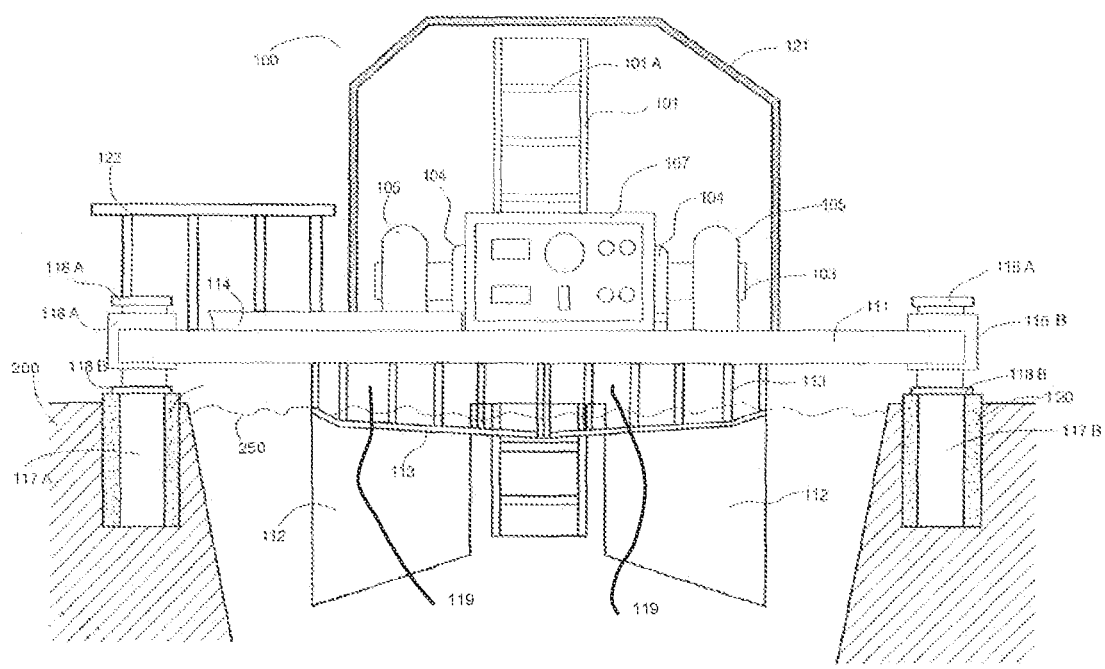
FIG. 3 is a schematic front view of the power generating and floating plant according to this invention.

As it can be noted in FIGS. 1 through 6, this invention consists in a power generating and floating plant (100) over a natural river, a man-made canal or similar for the generation of electricity that comprises:

a floating platform (102) of the Catamaran type with pontoons (112) that speed up the flow rate (300) entering into a turbine, with said platform being fastened to a stabilizing bar (111) that is fixed to regulating cylinders (117A, 117B) (pneumatic or hydraulic) in at least one side (200) of the river or canal, a metal grill (113) having a plurality of apertures and located upstream and between said pontoons (112) before the turbine, at least one turbine with a central shaft (103) lying on mounts (106) with self-lubricated bearings or bushing (104), wherein said turbine comprises a water wheel or runner (101) with curved vanes (410) and at least two supporting disks (400), where said curved vanes (410) rest, and where said supporting disks (400) comprise a plurality of radial and concentric holes (402); and a low-engine speed, permanent magnet generator (105) comprising a rotor directly coupled to said central shaft (103) and a stator with a frequency multiplier and a voltage regulator (124).

Figure 4:
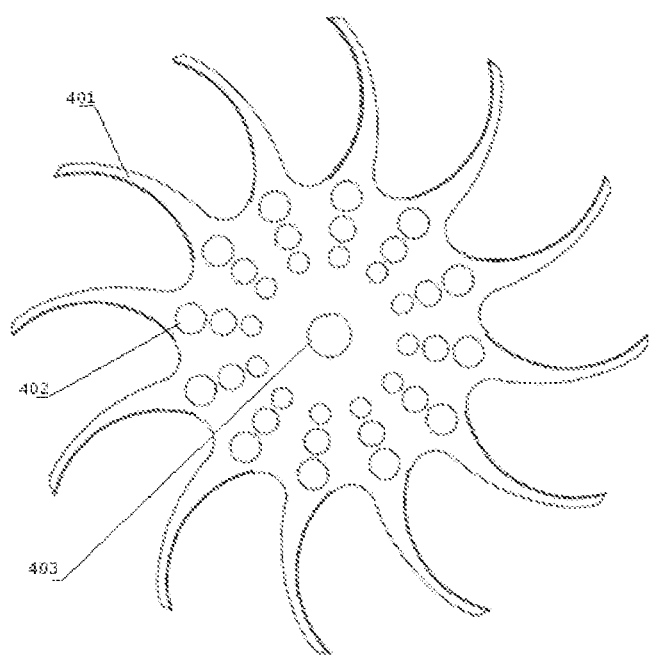
FIG. 4 schematically illustrates a supporting disk of the turbine runner according to a preferred assembly of this invention.
Figure 5:
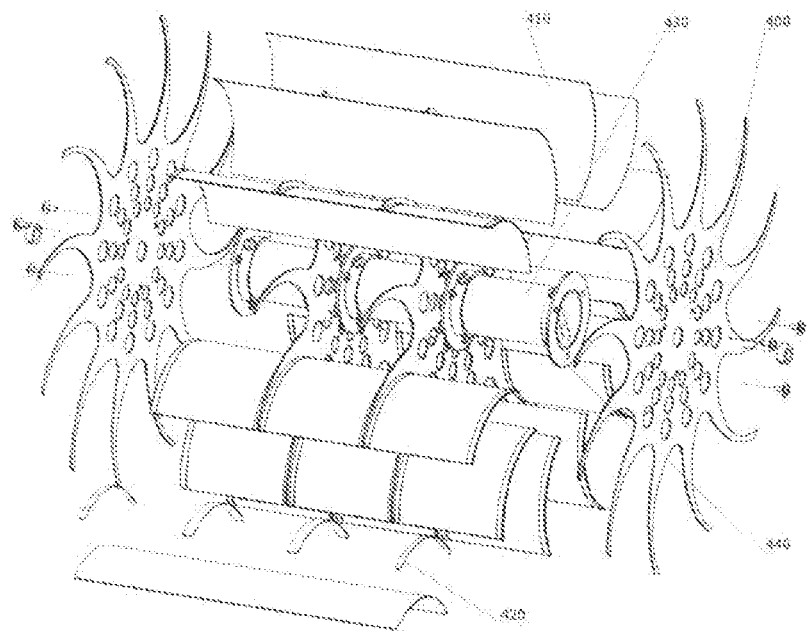
FIG. 5 is a schematic perspective and exploded view of a turbine runner or water wheel according to a preferred assembly of this invention.
Figure 6:
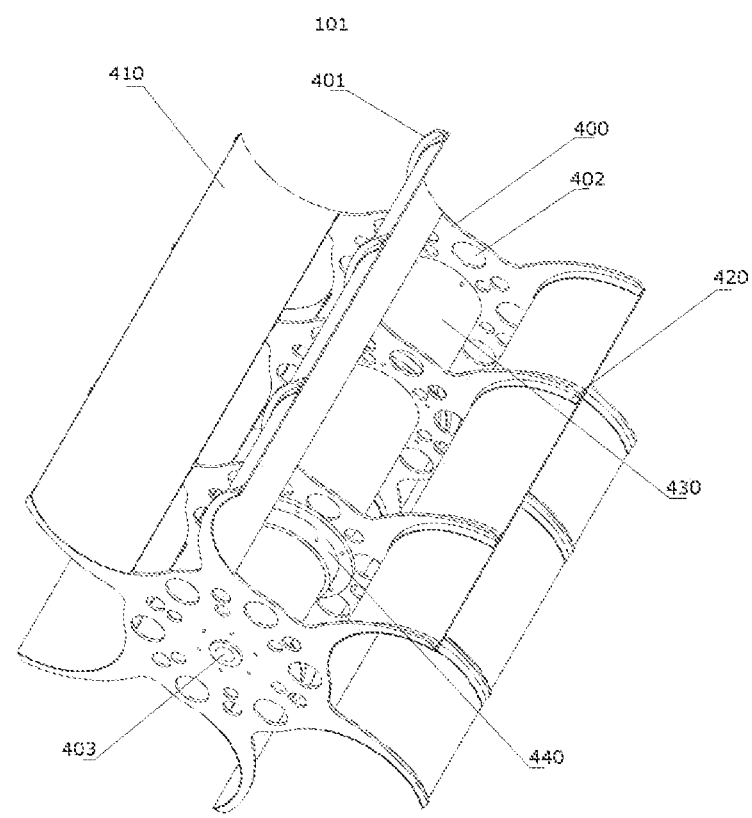
FIG. 6 is a schematic perspective view of the turbine runner or water wheel according to another preferred assembly of this invention.

As it can be noted in FIGS. 4 through 6, said runner or water wheel (101) is made up by a central cylindrical body (430), around which a plurality of supporting disks (400) is fixed arranged at least at the end of said cylindrical body (430) at equal distance each other; locking rings (440) located around said supporting disks (400) for their corresponding fastening to said central cylindrical body (400); and curved vanes (410) fixed by vane support (420) to said supporting disks (400).

In particular, said supporting disk (400) comprises a central hole (403) through which said central shaft (103) is coupled; a plurality of supporting arms for vanes (401) eccentrically projecting, curved and radially at the same distance each other; a plurality of radial and concentric holes (402) allowing the circulation of water among the different compartments of the water wheel (101).

Said radial and concentric holes (402) allow balancing the differences of pressure among the compartments of said turbine generated by the river's ebb current and turbulence when going through the turbine and the vanes (410), thus reducing the possibility of cavitations in the turbine rotor.

In a preferred assembly of this invention, said supporting disk (400) comprises six supporting arms for vanes (401). In another assembly of this invention, said supporting disk (400) comprises twelve supporting arms for vanes (401).

According to a preferred assembly of the invention, said stabilizing bar (111) is fixed to said regulating cylinders through fastening means (116A, 116B), such as self-lubricated bushings, at the ends of said stabilizing bar (111); said fastening means (116A, 116B) can be displaced over said regulating cylinders (117A, 117B) between two stops (118A, 118B), where said regulating cylinders (117A, 117B) are inserted in structures of reinforced concrete (120).

In an assembly of this invention, the floating platform (102) is vertically displaced according to the level of water (250) of the river or canal, being stabilized through a stabilizing bar (111) freely connected by the fastening means (116A, 116B) between the stops (118A, 118B) of said regulating cylinders (117A, 117B).

In another assembly of this invention, a hydraulic piston (not depicted by the figures) is provided inside said regulating cylinders (117A, 117B), wherein said hydraulic piston is connected to said fastening means (116A, 116B) through a slot in said regulating cylinders, and it is connected to a controlling hydraulic system comprising an electronic probe that records the level of water (250) of the river or canal. In this way, the electronic probe detects the level of water (250) and the depth to which the floating platform (102) is submerged in the riverbed or canal. Thus, the controlling hydraulic system can change the height of fastening means (116A, 116B) in the regulating cylinders (117A, 117B) through the hydraulic pistons in order to obtain the best efficiency.

In addition, this invention comprises an automatic controlling system installed in a control cabinet (107) with power cables arranged inside ducts (110A, 110B, 110C) connecting to a main duct (114); this main duct (114) with power cables is connected to an outlet duct (115) so that said power cables can be connected to a busbar, a distribution pole or consumption center.

According to an assembly of this invention, said main duct (114) is arranged over the stabilizing bar (111).

In addition, said floating platform (102) comprises a ramp (122) for an easier maintenance of the system. Said platform can be made of steel or aluminum. Said floating platform (102) also comprises a cover (121).

This invention can also comprise a protection or blocking means consisting in an aluminum or steel sheet (not visible in the figures) that slides around the metal grill (113) vertically.

The invention claimed is:

1. A power generating and floating plant over a flow of fluid for the generation of electricity comprising:
   a floating platform of the catamaran type with pontoons that accelerate the flow rate entering into a turbine;
   a grill having a plurality of apertures and disposed upstream from and between said pontoons before the turbine;
   wherein the turbine includes a central shaft, said turbine comprises a water wheel with curved vanes and at least two supporting disks, to which said curved vanes attach, and wherein said supporting disks include a plurality of holes arranged along a radius of the disk and concentrically; and
   a permanent magnet generator,
   wherein said platform is fastened to a stabilizing bar fixed to regulating cylinders in at least one side of the river or canal.

2. The power generating and floating plant according to claim 1, wherein said regulating cylinders are inserted in reinforced concrete structures.

3. The power generating and floating plant according to claim 2, wherein said stabilizing bar is fixed to said regulating cylinders through fastening means at the ends of said stabilizing bar, where said fastening means can be displaced over said regulating cylinders between two stops.

4. The power generating and floating plant according to claim 3, wherein said regulating cylinders are of the hydraulic type.

5. A power generating and floating plant according to claim 4, comprising at least one hydraulic piston inside said regulating cylinders, wherein said hydraulic piston is connected to said fastening means through a slot in said regulating cylinders, and it is connected to a controlling hydraulic system comprising an electronic probe that records the level of water of the river or canal.

6. The power generating and floating plant according to claim 1, wherein said water wheel is made up by a central cylindrical body, around which a plurality of supporting disks is fixed arranged at least at the end of said cylindrical body at equal distance each other; locking rings located around said supporting disks for their corresponding fastening to said central cylindrical body; and curved vanes fixed by vane support to said supporting disks.

7. The power generating and floating plant according to claim 6, wherein said supporting disk comprises a central hole through which said central shaft is coupled; a plurality of supporting arms for vanes eccentrically projecting, curved and radially at the same distance from each other; a plurality of radial and concentric holes allowing the circulation of water among the different compartments of the water wheel.

8. The power generating and floating plant according to claim 7, wherein said supporting disk comprises six supporting arms for vanes.

9. The power generating and floating plant according to claim 7, wherein said supporting disk comprises twelve supporting arms for vanes.

10. The power generating and floating plant according to claim 1, wherein said, permanent magnet generator includes a stator and a rotor, wherein the rotor is directly coupled to said central shaft.

11. The power generating and floating plant according to claim 1, wherein said central shaft lies on bearings with self-lubricated bearings or bushings.

12. The power generating and floating plant according to claim 1, wherein said plant additionally comprises an automatic controlling system installed in a control cabinet with power cables arranged inside ducts connecting to a main duct, where said main duct is connected to an outlet duct so that said power cables can be connected to a busbar, a distribution pole or consumption center.

13. The power generating and floating plant according to claim 1, wherein said floating platform comprises a ramp for an easier maintenance of the system.

14. The power generating and floating plant according to claim 1, wherein said platform is formed using steel or aluminum.

15. The power generating and floating plant according to claim 1, wherein said platform comprises a protecting or blocking means consisting in a sheet that slides vertically around the metal gate.

16. The power generating and floating plant according to claim 15, wherein said sheet is made of aluminum or steel.

17. The power generating and floating plant according to claim 1, wherein said supporting disk comprises:
    a central hole through which said central shaft is coupled;
    a plurality of supporting arms for vanes eccentrically projecting curvedly and radially away from the central hole.

* * * * *